(12) United States Patent
Parkinson et al.

(10) Patent No.: US 9,620,144 B2
(45) Date of Patent: Apr. 11, 2017

(54) CONFIRMATION OF SPEECH COMMANDS FOR CONTROL OF HEADSET COMPUTERS

(71) Applicant: Kopin Corporation, Westborough, MA (US)

(72) Inventors: Christopher Parkinson, Richland, WA (US); Jeffrey J. Jacobsen, Hollister, CA (US); Stephen A. Pombo, Campbell, CA (US); David B. Ferguson, Boca Raton, FL (US)

(73) Assignee: Kopin Corporation, Westborough, MA (US)

( * ) Notice: Subject to any disclaimer, the term of this patent is extended or adjusted under 35 U.S.C. 154(b) by 356 days.

(21) Appl. No.: 14/142,280

(22) Filed: Dec. 27, 2013

(65) Prior Publication Data
US 2014/0195247 A1    Jul. 10, 2014

Related U.S. Application Data

(60) Provisional application No. 61/749,243, filed on Jan. 4, 2013.

(51) Int. Cl.
| G10L 15/22 | (2006.01) |
| G10L 21/06 | (2013.01) |
| G02B 27/01 | (2006.01) |
| G06F 3/16  | (2006.01) |
| G06F 1/32  | (2006.01) |

(52) U.S. Cl.
CPC ............ *G10L 21/06* (2013.01); *G02B 27/017* (2013.01); *G06F 1/3215* (2013.01); *G06F 3/16* (2013.01); *G10L 15/22* (2013.01); *G02B 2027/014* (2013.01); *G10L 2015/225* (2013.01)

(58) Field of Classification Search
CPC .................... G10L 15/22; G10L 2015/225
See application file for complete search history.

(56) References Cited

U.S. PATENT DOCUMENTS

| 4,945,570 A | 7/1990 | Gerson et al. |
| 5,990,793 A | 11/1999 | Bieback |
| 6,010,216 A | 1/2000 | Jesiek |

(Continued)

FOREIGN PATENT DOCUMENTS

| EP | 2 200 020 | 6/2010 |
| WO | WO 95/21408 | 8/1995 |

(Continued)

OTHER PUBLICATIONS

Notification of Transmittal of the International Search Report and The Written Opinion of the International Searching Authority, or the Declaration, PCT/US2012/037284, "Headset Computer That Uses Motion and Voices to Control Information Display and Remote Devices," date of mailing Oct. 1, 2012.

(Continued)

*Primary Examiner* — Jialong He
(74) *Attorney, Agent, or Firm* — Hamilton, Brook, Smith & Reynolds, P.C.

(57) ABSTRACT

Presented are improvements for speech recognition systems used to control devices. Features include two-stage confirmation, two-stage limited speech recognition mode, and two-stage wake-up for speech driven applications and systems. A headset computer device includes such staged confirmation operation.

11 Claims, 7 Drawing Sheets

(56) References Cited

U.S. PATENT DOCUMENTS

| | | | |
|---|---|---|---|
| 6,108,197 A | 8/2000 | Janik | |
| 6,144,938 A * | 11/2000 | Surace | G10L 13/033 704/257 |
| 6,325,507 B1 | 12/2001 | Jannard et al. | |
| 6,424,357 B1 * | 7/2002 | Frulla | G06F 3/038 715/716 |
| 6,798,391 B2 | 9/2004 | Peterson, III | |
| 6,853,293 B2 | 2/2005 | Swartz et al. | |
| 6,966,647 B2 | 11/2005 | Jannard et al. | |
| 7,004,582 B2 | 2/2006 | Jannard et al. | |
| 7,013,009 B2 | 3/2006 | Warren | |
| 7,082,393 B2 | 7/2006 | Lahr | |
| 7,147,324 B2 | 12/2006 | Jannard et al. | |
| 7,150,526 B2 | 12/2006 | Jannard et al. | |
| 7,213,917 B2 | 5/2007 | Jannard et al. | |
| 7,216,973 B2 | 5/2007 | Jannard et al. | |
| 7,219,994 B2 | 5/2007 | Jannard et al. | |
| 7,231,038 B2 | 6/2007 | Warren | |
| 7,278,734 B2 | 10/2007 | Jannard et al. | |
| 7,331,666 B2 | 2/2008 | Swab et al. | |
| 7,445,332 B2 | 11/2008 | Jannard et al. | |
| 7,452,073 B2 | 11/2008 | Jannard et al. | |
| 7,461,936 B2 | 12/2008 | Jannard | |
| 7,494,216 B2 | 2/2009 | Jannard et al. | |
| 7,496,387 B2 * | 2/2009 | Byford | H04M 1/6066 381/74 |
| 7,512,414 B2 | 3/2009 | Jannard et al. | |
| 7,620,432 B2 | 11/2009 | Willins et al. | |
| 7,682,018 B2 | 3/2010 | Jannard | |
| 7,744,213 B2 | 6/2010 | Jannard et al. | |
| 7,760,898 B2 | 7/2010 | Howell et al. | |
| 7,806,525 B2 | 10/2010 | Howell et al. | |
| 7,918,556 B2 | 4/2011 | Lewis | |
| 7,959,084 B2 | 6/2011 | Wulff | |
| 7,966,189 B2 | 6/2011 | Le et al. | |
| 7,969,383 B2 | 6/2011 | Eberl et al. | |
| 7,976,480 B2 | 7/2011 | Grajales et al. | |
| 7,988,283 B2 | 8/2011 | Jannard | |
| 7,997,723 B2 | 8/2011 | Pienimaa et al. | |
| 8,010,156 B2 | 8/2011 | Warren | |
| 8,020,989 B2 | 9/2011 | Jannard et al. | |
| 8,072,393 B2 | 12/2011 | Riechel | |
| 8,212,859 B2 | 7/2012 | Tang et al. | |
| 8,275,617 B1 * | 9/2012 | Morgan | G10L 15/22 704/251 |
| 2002/0015008 A1 * | 2/2002 | Kishida | G06F 1/163 345/7 |
| 2002/0094845 A1 | 7/2002 | Inasaka | |
| 2003/0068057 A1 | 4/2003 | Miller et al. | |
| 2003/0144845 A1 * | 7/2003 | Lee | G10L 15/22 704/275 |
| 2005/0033571 A1 * | 2/2005 | Huang | G10L 15/20 704/231 |
| 2005/0105117 A1 * | 5/2005 | Oh | G06F 3/1208 358/1.13 |
| 2005/0165609 A1 | 7/2005 | Zuberec et al. | |
| 2005/0264527 A1 | 12/2005 | Lin | |
| 2006/0132382 A1 | 6/2006 | Jannard | |
| 2006/0167696 A1 | 7/2006 | Chaar et al. | |
| 2007/0143105 A1 * | 6/2007 | Braho | G10L 15/30 704/231 |
| 2007/0183616 A1 * | 8/2007 | Wahl | H04M 1/05 381/370 |
| 2008/0169998 A1 | 7/2008 | Jacobsen et al. | |
| 2008/0291277 A1 | 11/2008 | Jacobsen et al. | |
| 2009/0099836 A1 * | 4/2009 | Jacobsen | G06F 17/289 704/3 |
| 2009/0128448 A1 | 5/2009 | Riechel | |
| 2009/0154719 A1 | 6/2009 | Wulff et al. | |
| 2010/0020229 A1 | 1/2010 | Hershey et al. | |
| 2010/0053069 A1 | 3/2010 | Tricoukes et al. | |
| 2010/0121480 A1 | 5/2010 | Stelzer et al. | |
| 2010/0161339 A1 * | 6/2010 | De Mers | G10L 15/01 704/275 |
| 2010/0238184 A1 | 9/2010 | Janicki | |
| 2011/0001699 A1 * | 1/2011 | Jacobsen | G06F 3/012 345/157 |
| 2011/0050653 A1 * | 3/2011 | Miyazawa | G06F 3/0482 345/179 |
| 2011/0090135 A1 | 4/2011 | Tricoukes et al. | |
| 2011/0214082 A1 | 9/2011 | Osterhout et al. | |
| 2011/0221669 A1 | 9/2011 | Shams et al. | |
| 2011/0221671 A1 | 9/2011 | King, III et al. | |
| 2011/0227812 A1 | 9/2011 | Haddick et al. | |
| 2011/0227813 A1 | 9/2011 | Haddick et al. | |
| 2011/0254698 A1 | 10/2011 | Eberl et al. | |
| 2011/0255050 A1 | 10/2011 | Jannard et al. | |
| 2012/0056846 A1 | 3/2012 | Zaliva | |
| 2012/0062445 A1 | 3/2012 | Haddick et al. | |
| 2012/0105740 A1 | 5/2012 | Jannard et al. | |
| 2013/0033643 A1 * | 2/2013 | Kim | G06F 3/017 348/563 |
| 2013/0300649 A1 | 11/2013 | Parkinson et al. | |

FOREIGN PATENT DOCUMENTS

| | | |
|---|---|---|
| WO | WO 95/23994 | 9/1995 |
| WO | WO 2009/076016 | 6/2009 |
| WO | WO 2012/040386 | 3/2012 |
| WO | WO 2012/154938 A1 | 11/2012 |

OTHER PUBLICATIONS

International Search Report and Written Opinion for PCT/US2013/078079 dated Apr. 29, 2014; entitled "Bifurcated Speech Recognition".

International Preliminary Report on Patentability for PCT/US2013/078079 dated Jul. 16, 2015 entitled "Bifurcated Speech Recognition".

* cited by examiner

CONFIRMATION OF SPEECH COMMANDS FOR CONTROL OF HEADSET COMPUTERS

RELATED APPLICATIONS

This application claims the benefit of U.S. Provisional Application No. 61/749,243, filed on Jan. 4, 2013. The following has related subject matter to U.S. application Ser. No. 12/008,114, filed on Jan. 8, 2008, U.S. application Ser. No. 12/008,104, filed on Jan. 8, 2008, and U.S. application Ser. No. 13/468,207, filed on May 10, 2012. The foregoing applications are herein incorporated in their entirety.

BACKGROUND OF THE INVENTION

Speech Recognition (ASR) systems are used to control devices. For the most part, ASR systems work well and allow a user to navigate and control a system with a high degree of accuracy.

However there are a number of occasions when a high degree of accuracy is not enough and only 100% accuracy is acceptable. Alternatively there may be occasions where we absolutely cannot let the ASR trigger accidentally due to noise or have it misinterpreting spoken conversation as real commands.

SUMMARY OF THE INVENTION

The present invention addresses the foregoing problems and disadvantages in the art. To account for the above occasions, Applicants have designed a two-stage confirmation process.

In particular, ASR embodiments of the present invention provide the features of:
- a two-stage confirmation;
- a two-stage limited speech recognition mode, and/or
- a two-stage wake-up for speech driven systems.

In a preferred embodiment, the invention relates to a method of speech control in a computer application, wherein, given a headset computer having a microphone and a display, receiving a sound input via the microphone, sound input is processed using a speech recognition engine coupled to the headset computer. As part of this processing, the speech recognition engine is used to interpret the sound input to determine whether it is a command for an action having a level of criticality that meets or exceeds a threshold level of criticality, a so-called critical command. If it is determined that a command is a critical command, then a first dialog box is displayed on a display and the performance of the action associated with the command is conditioned on a user making a first confirmatory utterance corresponding to a prompt in the first dialog box. In other embodiments, the method described above in this paragraph further involves the first dialog box having the ability to automatically time-out or the critical command being a command for the headset computer to disengage from a low power sleep mode or from a limited speech recognition mode.

In another preferred embodiment, the method further involves receiving via the microphone the first confirmatory utterance corresponding to the prompt in the first dialog box; and displaying a second dialog box on the display in response to the receipt of the first confirmatory utterance, the headset computer conditioning performance of the action on the user making a secondary confirmatory utterance corresponding to a prompt in the second dialog box. In other embodiments, the method described above in this paragraph further involves the second dialog box having the ability to automatically time-out or the critical command being a command for the headset computer to disengage from a low power sleep mode or from a limited speech recognition mode. In yet another embodiment, the first confirmatory utterance and the second confirmatory utterance are different from each other.

Computer systems, headset computers, devices and apparatus may implement the foregoing methods. Yet other embodiments that carry out the above method include computer program products.

In a preferred embodiment, the invention relates to a speech control apparatus that, given a headset computer having a display and a microphone configured to receive a sound input; comprises a speech recognition engine configured to interpret the sound input and as part of that interpretation to determine whether the sound input is a command for an action having a level of criticality that meets or exceeds a threshold level of criticality, said command being a critical command; and a processor communicatively coupled to the speech recognition engine. In response to a determination by the speech recognition engine that a sound input is a critical command, the processor is configured to display a first dialog box on the display, and to condition headset computer performance of the action on a user making a first confirmatory utterance corresponding to a prompt in the first dialog box. In other embodiments, the speech control apparatus described above in this paragraph further involves the first dialog box having the ability to automatically time-out or the critical command being a command for the headset computer to disengage from a low power sleep mode or from a limited speech recognition mode.

In another preferred embodiment, the apparatus further involves receiving via the microphone the first confirmatory utterance corresponding to the prompt in the first dialog box; and displaying a second dialog box on the display in response to the receipt of the first confirmatory utterance, the headset computer conditioning performance of the action on the user making a secondary confirmatory utterance corresponding to a prompt in the second dialog box. In still other embodiments, the apparatus described above in this paragraph further involves the second dialog box having the ability to automatically time-out or the critical command being a command for the headset computer to disengage from a low power sleep mode or from a limited speech recognition mode. In yet another embodiment, the first confirmatory utterance and the second confirmatory utterance are different from each other.

In yet another preferred embodiment, the invention relates to a headset computer comprising a display; a microphone receiving sound input; a speech recognition engine configured to interpret the sound input and as part of that interpretation to determine whether the sound input is a command for an action having a level of criticality that meets or exceeds a threshold level of criticality, said command being a critical command; and a processor communicatively coupled to the speech recognition engine. In response to a determination by the speech recognition engine that a sound input is a critical command, the processor is configured to display a first dialog box on the display, and to condition headset computer performance of the action on a user making a first confirmatory utterance corresponding to a prompt in the first dialog box.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
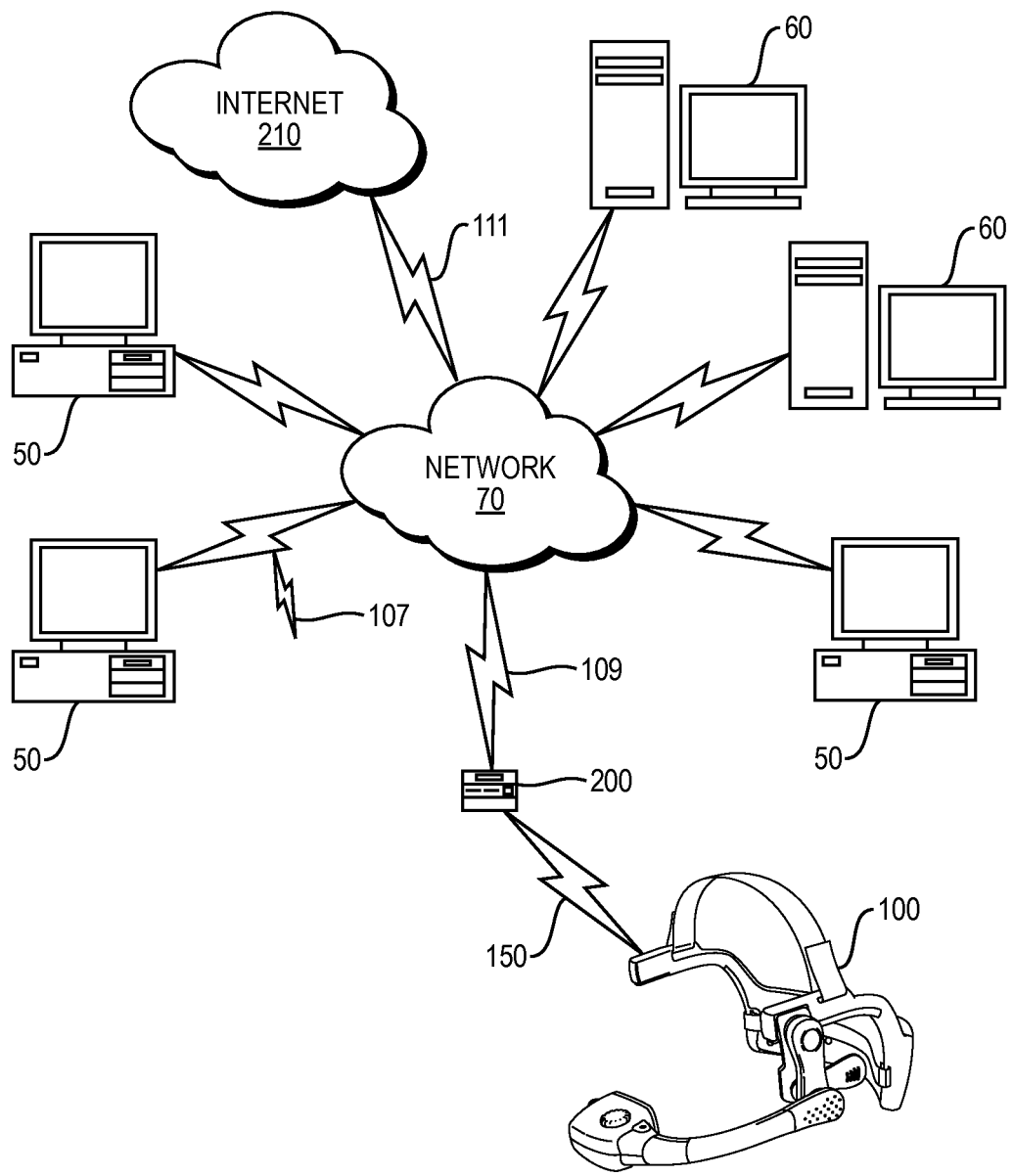
FIG. 1 is a schematic view of a computer network embodying the present invention.

FIG. 1 illustrates one of a variety of computer networks or similar digital processing environments in which the present invention can be implemented. FIG. 1 depicts client computer(s)/devices 50 and server computer(s) 60 that can provide processing, storage, and input/output devices associated with executing application programs and the like. These devices are connected via links, e.g., link 107, to a network 70. Network 70 can be, or be a part of, a remote access network, a global network (e.g., the Internet), a worldwide collection of computers, Local area or Wide area network, or gateways, that currently use respective protocols (TCP/IP, Bluetooth, etc.) to communicate with one another. Other electronic device/computer network architectures are suitable. Network 70 can in turn be connected to one or more additional networks, such as the Internet 210, via link 111. Links 107 and 111 can take a variety of physical forms, e.g., wired and wireless, and can effect communication using a variety of signals and protocols.

In embodiments, client computer(s)/devices 50 are worn on the head and use motion and voice commands to control information display, and remote devices, and so on as detailed in U.S. application Ser. Nos. 12/008,114, 12/008, 104, and 13/468,207, by applicant, and incorporated herein by reference. These head worn computing devices can take a variety of forms, such as head worn computers, head mounted display devices, and headset computers. These head worn computing devices are referred to herein as "headset computing devices" or HSC 100, and embodiments of HSCs 100 are further described below.

An HSC 100 can be configured and used in a wide variety of ways. In some embodiments, an HSC 100 can connect directly to computer network 70. In other embodiments, such as depicted in FIG. 1, an HSC 100 connects to computer network 70 via a remote host computing device 200 with which the HSC 100 is in communication via link 150. In operation, HSC 100 can be used, for example, as a remote display for streaming video signals received from remote host computing device 200.

A variety of devices can serve as the remote host computing device 200, including for example, a notebook PC, smart phone, tablet device, or other computing device having less or greater computational complexity than the wireless computing headset device 100, such as cloud-based network resources. Host 200 can be further connected to additional networks, such as the Internet 210, a cable network, a third party data network, etc., either directly or via network 70.

A variety of links 150 can be used to enable communication between headset HSC 100 and host 200. In embodiments, link 150 is a wireless link, and communication is via one or more wireless protocols, such as Bluetooth®, Wi-Fi, WiMAX, or 4G LTE. (Bluetooth is a registered trademark of Bluetooth Sig, Inc. of 5209 Lake Washington Boulevard, Kirkland, Wash. 98033.) In an example embodiment, as is depicted in FIG. 1, host 200 is connected to network 70 via connection 109, which can be a wireless connection, and network 70 is in turn connected to the Internet 210 or other cloud-based network resources, so that the host 200 can act as a wireless relay. In other embodiments, host 200 is connected directly to Internet 210 or other cloud-based resources. In addition, some example embodiments of HSC 100 can wirelessly connect to the Internet and cloud-based network resources without the use of a host wireless relay.

Client computer(s)/devices 50, HSC 100, and hosts 200 can be linked through communications network 70 to other computing devices, including other client devices/processors 50, server computers 60, HSC 100, and hosts 200.

Figure 2:
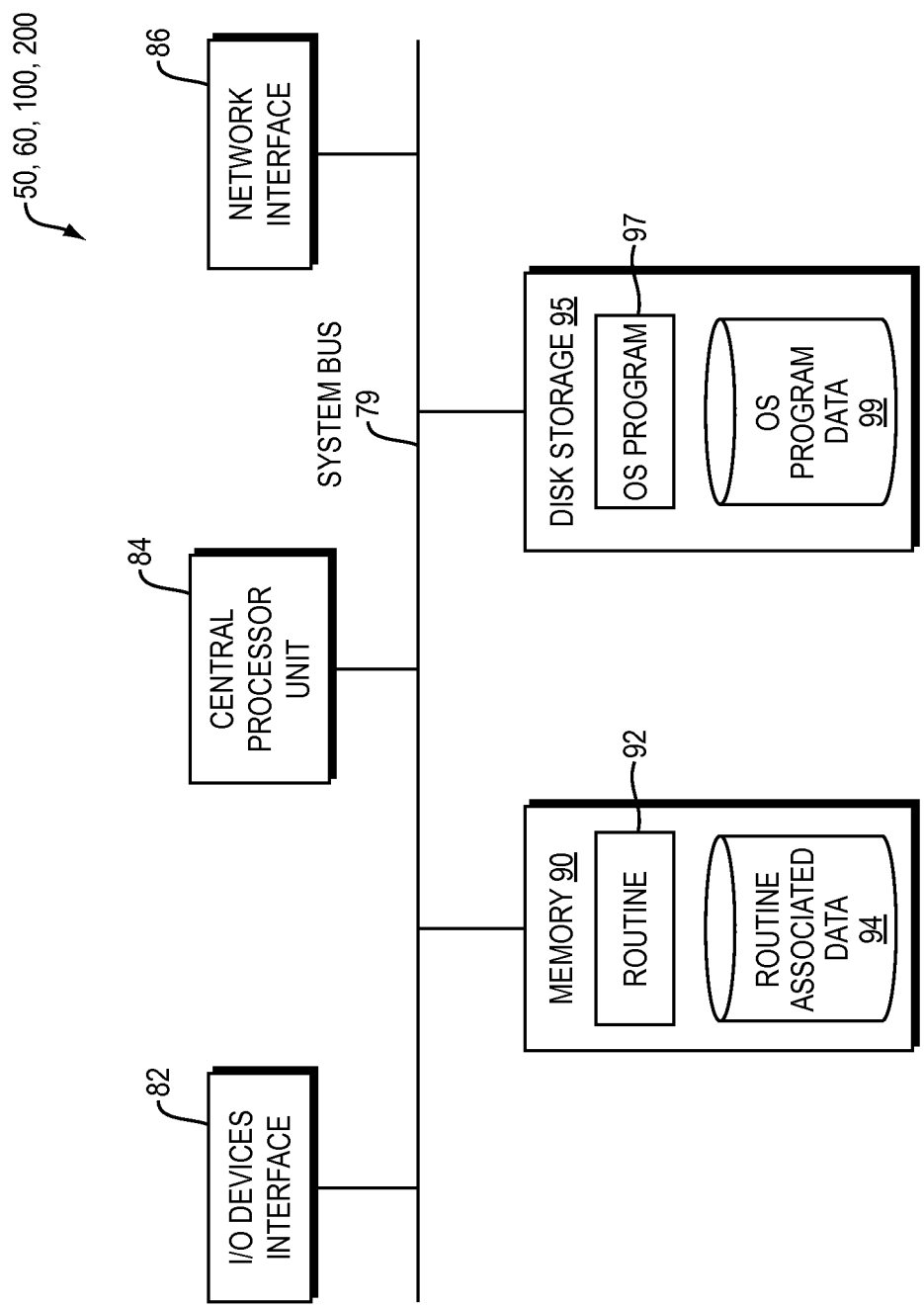
FIG. 2 is a block diagram of a computer node in the embodiment of FIG. 1.

FIG. 2 is a diagram of the internal structure of a computer (e.g., client processor/device 50, 100, 200 or server computer 60) in the exemplary computer network of FIG. 1, hereinafter computer 50, 60, 100, 200. Computer 50, 60, 100, 200 contains a system bus 79, where a bus is a set of hardware lines used for data transfer among the components of a computer or processing system. System bus 79 is essentially a shared conduit that connects different elements of a computer system (e.g., processor, disk storage, memory, input/output ports, network ports, etc.) that enables the transfer of information between the elements. As shown in FIG. 2, several components are attached to system bus 79.

Input/output (I/O) device interface 82 connects various input and output devices (e.g., keyboard, mouse, displays, printers, speakers, etc.) to computer 50, 60, 100, 200. Central processor unit 84 provides for the execution of computer instructions. Network interface 86 allows computer 50, 60, 100, 200 to connect to various other devices attached to a network (e.g., network 70 of FIG. 1). Memory 90 provides volatile storage for computer software instructions, such as a processor routine 92, and associated data 94 used to implement an embodiment of the present invention (e.g., a two-stage speech recognition engine, user interface and supporting code detailed below). Disk storage 95 provides non-volatile storage for computer software instructions, such as OS Program 97 and associated data 99, used to implement an embodiment of the present invention.

In one embodiment, processor routines 92 and associated data 94 are a computer program product (generally referenced as 92), including a computer readable medium (e.g., a non-removable or a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art.

In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In other embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer.

In yet another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In embodiments, the processing routine program instructions or other operations 92 stored in memory 90 or disk storage 95 implement a speech recognition engine with two-stage confirmation according to the principles of the present invention. FIGS. 3 through 7 are illustrative.

Figure 3:
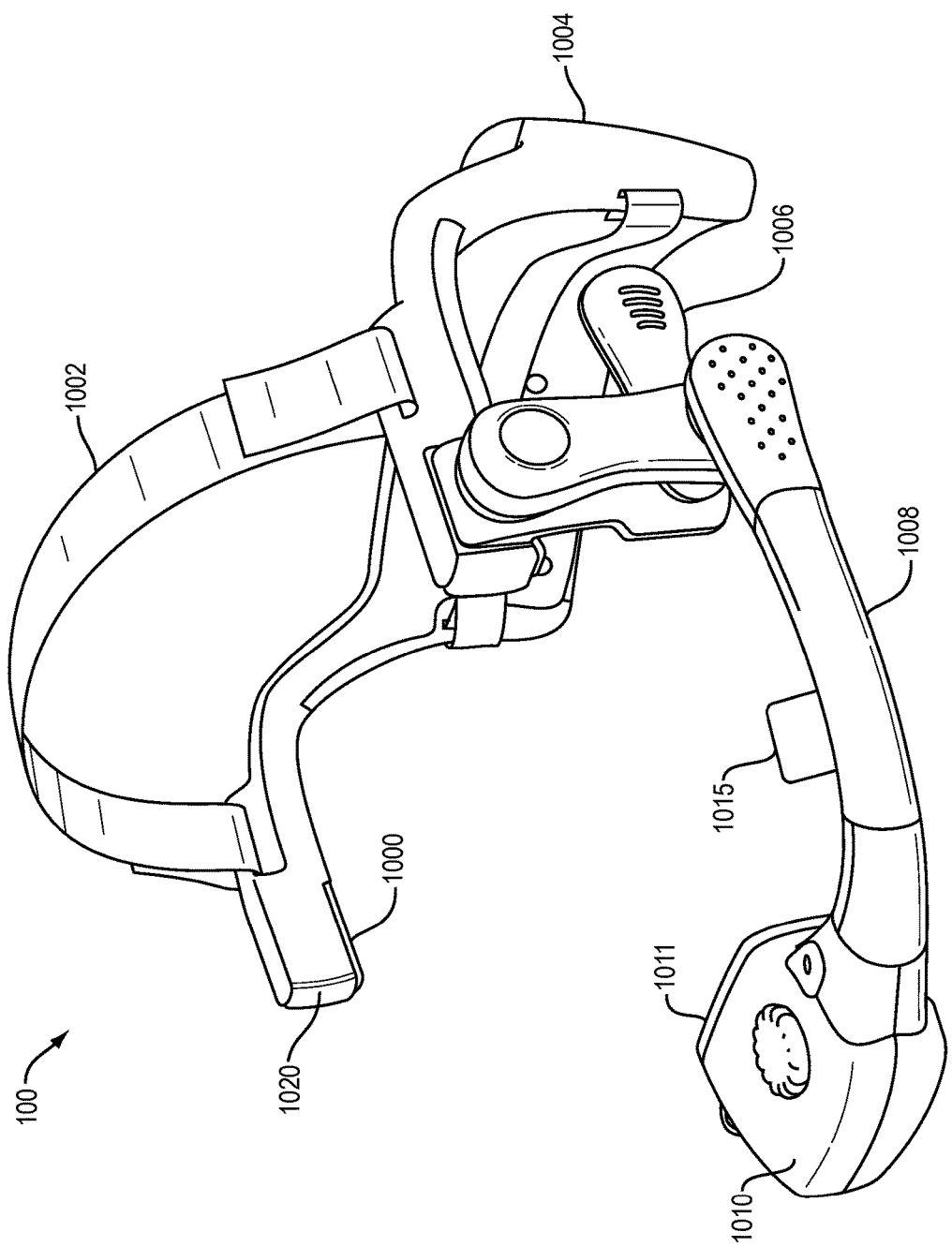
FIG. 3 is a schematic view of a headset computer implementing two-stage confirmation in ASR according to the present invention.

FIG. 3 a perspective view showing some details of an embodiment of a headset computer 100. Embodiments of HSC 100 generally include a frame 1000, strap 1002, rear housing 1004, speaker 1006, cantilever (alternatively referred to as an arm or boom 1008) with a built in microphone 1015, and a microdisplay subassembly 1010, with display element 1011.

The head worn frame 1000 and strap 1002 are generally configured so that a user can wear the HSC 100 on the user's head. Rear housing 1004 is generally a low profile unit which houses the electronics, such as the microprocessor, memory or other storage device, along with other associated circuitry. Speakers 1006 provide audio output to the user so that the user can hear information. Microphone 1015 allows the user to provide audio input and is preferably configured to be close to the user's mouth to maximize the signal to noise ratio, and may in some embodiments employ a directional microphone.

Microdisplay subassembly 1010 is used to render visual information to the user via a display element 1011, such as a high-resolution (VGA or better) microdisplay element. Other display elements can also be used. Subassembly 1010 is coupled to arm 1008. While what is depicted in FIG. 3 is a monocular microdisplay presenting a single fixed display element supported on the face of the user with a cantilevered boom, it should be understood that other mechanical configurations for the remote control display device 100 are possible.

Arm 1008 generally provides physical support such that the microdisplay subassembly is able to be positioned within the user's field of view, preferably in front of the eye of the user or within its peripheral vision preferably slightly below or above the eye. Arm 1008 also provides the electrical or optical connections between the microdisplay subassembly 1010 and the control circuitry housed within housing unit 1004. According to aspects that will be explained in more detail below, HSC 100 allows a user to select a field of view within a much larger area defined by a virtual display at display element 1011. The user can typically control the position, extent (e.g., X-Y or 3D range), and/or magnification of the field of view.

Typically located within the housing of headset computing device 100 are various electronic circuits including, a microcomputer (single or multicore processors), one or more wired and/or wireless communications interfaces, memory or storage devices, various sensors and a peripheral mount or mount, such as a "hot shoe." These are not individually shown in detail in FIG. 3.

HSC 100 can include a wide variety of devices and features in addition to or in place of those described above in relation to FIG. 3. These include a wide variety of audio input and/or output devices, including one or more microphones, input and output speakers, geo-positional sensors (GPS), three to nine axis degrees of freedom orientation sensors, atmospheric sensors, health condition sensors, digital compass, pressure sensors, environmental sensors, energy sensors, acceleration sensors, position, attitude, motion, velocity and/or optical sensors, cameras (visible light, infrared, etc.), multiple wireless radios, auxiliary lighting, rangefinders, or the like and/or an array of sensors embedded and/or integrated into the headset and/or attached to the device via one or more peripheral ports (not shown in detail in FIG. 3).

Example embodiments of HSC 100 can receive user input through sensing voice commands, head movements, and hand gestures, or any combination thereof. Gyroscopes, accelerometers, and other micro-electromechanical system sensors can be integrated into HSC 100 and used to track the user's head movement to provide user input commands. Cameras or other motion tracking sensors can be used to monitor a user's hand gestures for user input commands. Such a user interface overcomes the hands-dependent formats of other mobile devices.

In operation of an exemplary HSC device 100, the device receives one or more of a wide variety of inputs from the user, such as (a) vocal input from the user via microphone 1015, (b) hand movement inputs or body gesture inputs via positional and orientation sensors, or via cameras or optical sensors, and (c) head movement inputs via the head tracking circuitry such as 3 axis to 9 axis degrees of freedom orientational sensing. In a preferred embodiment, at least one of the inputs is voice input.

These inputs are translated by software in the HSC device 100 into keyboard and/or mouse commands that are then sent over the Bluetooth or other wireless interface 150 to the host 200. The host 200 then interprets these translated commands in accordance with its own operating system/ application software to perform various functions. Among the commands is one to select a field of view within the virtual display and return that selected screen data to the HSC device 100. Thus, it should be understood that a very large format virtual display area might be associated with application software or an operating system running on the host 200. However, only a portion of that large virtual display area within the field of view is returned to and actually displayed by the microdisplay 1011 of HSC device 100.

In one embodiment, HSC 100 can take the form of the HSC described in a co-pending U.S. Patent Publication No.

2011/0187640, which is hereby incorporated by reference in its entirety. In another embodiment, the invention relates to the concept of using a Head Mounted Display (HMD) such as 1010 and 1011 in conjunction with an external 'smart' device 200 (such as a smartphone or tablet) to provide information and control to the user hands-free. The invention requires transmission of small amounts of data, providing a more reliable data transfer method running in real-time.

In this sense therefore, the amount of data to be transmitted over the connection 150 is small, simply instructions on how to lay out a screen, which text to display, and other stylistic information such as drawing arrows, or the background colors, images to include, etc. Additional data could be streamed over the same 150 or another connection and displayed on a screen, such as display element 1011, such as a video stream if required by the host 200.

In embodiments, microphone 1015 is operatively coupled or preferably integrated into the HSC 100, and can be used to capture speech commands, which are then digitized and processed using automatic speech recognition techniques.

It should be appreciated that some commands, if executed, can cause irreversible consequences, such as deleting a file. As a result, it is desirable to ensure that such commands are not erroneously executed.

Sources of error could include, for example, spurious audio input, e.g., background noise, that is correctly, or incorrectly, recognized as a triggering command by the system 100. The user might also inadvertently provide audio/speech/sound input to the microphone 1015, such as by carrying on a conversation with another person, without turning off, or deactivating, voice command on the headset 100. Still yet another source of error is the erroneous processing of digital signals into recognized speech content. Speech recognition engines do not always reliably translate speech to text. This may be particularly problematic for users with accents (relative to the speech and voice patterns expected by the programmers) and users that have not yet "trained" the speech engine to their voice.

These sources of error may be particularly acute in the environments and conditions under which HSC 100 can be used. In emergency situations, for example, such as a car accident scene, fire, emergency room setting, or in a military setting including in combat, the device will be worn in an environment with considerable background noise. In addition, psychic stress can alter syntax and speech patterns which can make speech recognition more difficult. Further, HSC 100 can be worn by first responders who may share the devices with a number of other individuals, reducing the likelihood that users have "trained" the speech recognition engines. In many settings, it will be desirable to wear HSC 100 for extended periods once donned, such as, for example during emergencies of extended duration, armed combat, military operations, surgery, and any situation in which the ability to be in continued voice and/or video communication is desirable or critical. As a result, a user may not remove HSC 100 when talking directly to others around him, and may neglect to turn off, disable, or place the device in safe mode so that the user's voice is not interpreted as intentional command input.

The error rate of speech engines also can also depend on the quality of the microphone used, the enunciation vel non of the user, whether background noise is present, and the algorithm and heuristics used by the speech engine. In some cases, speech engines may be programmed to provide output, even where conclusions as to the text are speculative. While artful speculation may be desirable in many instances, it can also increase the rate of unintentional execution of commands or other activity.

Aspects of the present invention relate to reducing the rate of unintended execution of commands or the commission of other activity as a result of an voice/sound/audio input, including such input from the user, from a head set computer 100. There can be trade-off between the facile operation of a speech driven HSC 100 and the avoidance of unintended operation via sound input. At the one extreme, all commands can be made subject to a confirmation process of some kind. At the other extreme, no commands are made subject to confirmation. In some cases, a better approach is for the system to process audio input using an ASR engine, determine whether the audio (sound-based) input is recognized as a voice command, and if it is so recognized, assess the criticality of the action associated with that voice command. Rules, table, or database look up, or other data structures 94 and program configurations may be stored in memory 90 (FIG. 2), 9120 (FIG. 7) and employed to implement assessment of criticality of an action. The assessed criticality of the action associated with the command about to be executed determines the extent of confirmation required by HSC 100 prior to acting on the command.

For example, critical actions could be actions that are not easily undone or that if performed erroneously would have particularly undesirable consequences. Examples could include actions that would result in the permanent deletion of a file, transmission of confidential or sensitive material, activation of peripheral devices, and so on. In a military setting, where an HSC 100 is used to activate systems or devices capable of destruction, including potentially lethal systems, the need for safeguards against accidental voice activation is particularly acute. At the same time in such as setting, it is desirable not to impede the use of the system (e.g., condition and/or delay initiation/implementation/completion of an action) unless absolutely necessary to avoid potentially dire consequences.

As a result, it is desirable in accordance with aspects of the invention that the system be able to assess the criticality of an action associated with a putatively recognized command, and if critical, solicit confirmatory input. The confirmation sought by aspects of the invention can be achieved in a variety of ways.

Figure 4:
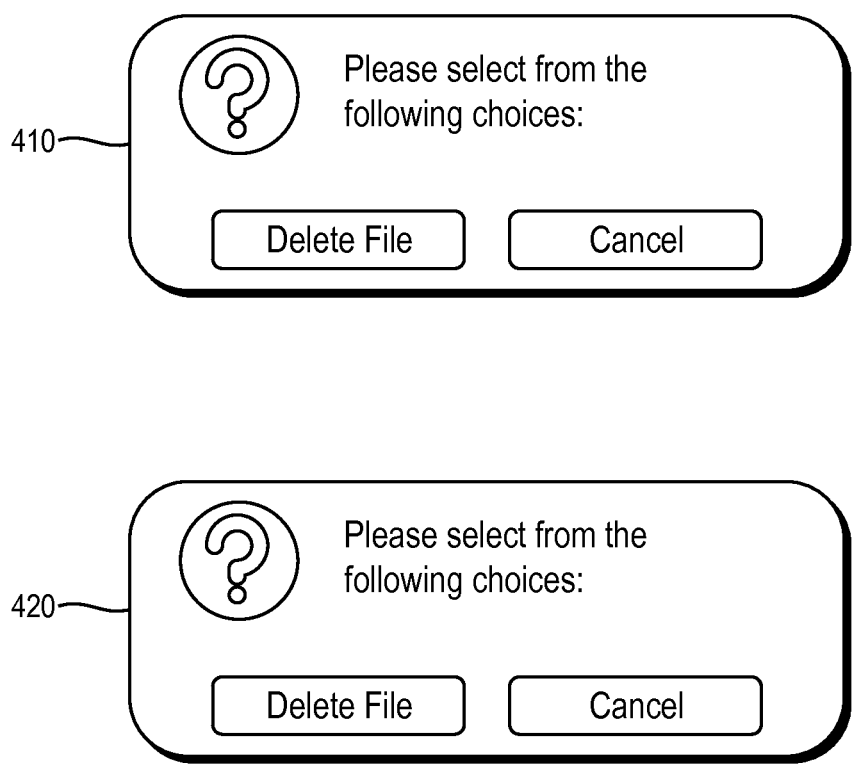
FIG. 4 is a schematic illustration of a speech driven system user interface having two-stage limited speech recognition.
Figure 5:
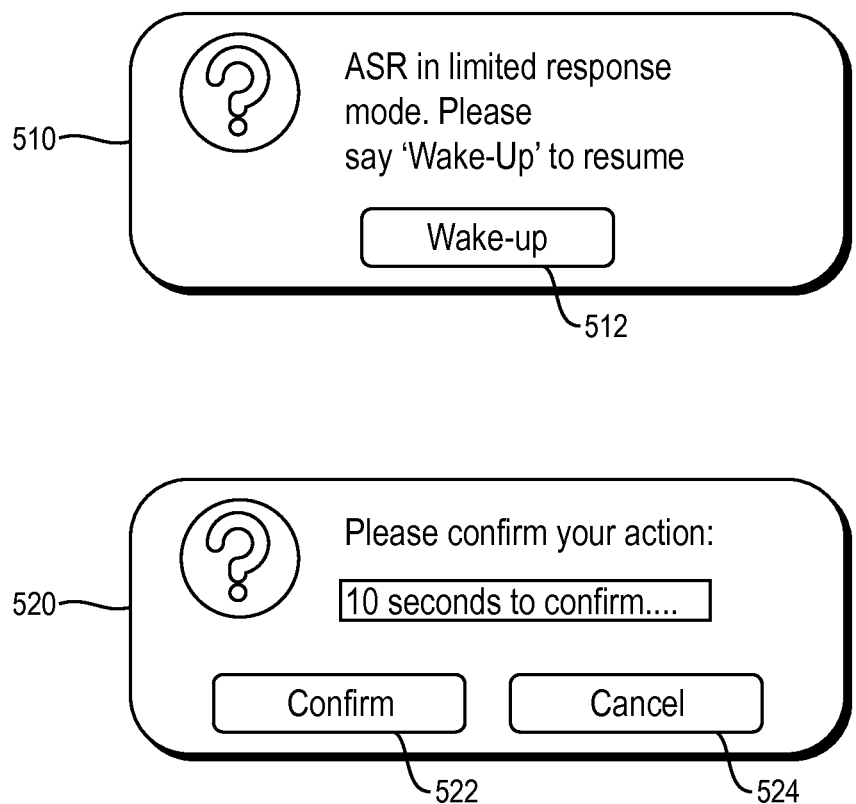
FIG. 5 is a schematic illustration of a user interface having two-stage confirmation in accordance with the present invention.
Figure 6:
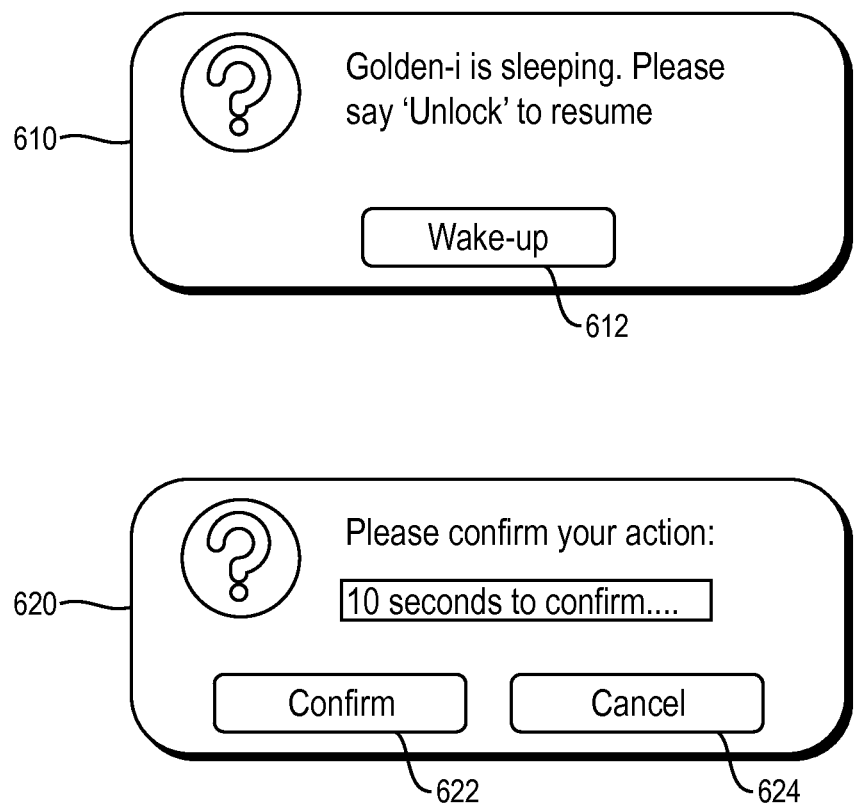
FIG. 6 is a schematic illustration of two-stage wake-up in a speech driven system.

Turning now to FIGS. 4 through 6, three example embodiments of the user interface screen views implementing two-stage confirmation in ASR applications according to the present invention are presented. Example 1 is discussed first and corresponds to the illustration of FIG. 4. Example 2 follows and corresponds to the illustrations of FIG. 5. Example 3 is presented last and corresponds to the illustrations of FIG. 6.

EXAMPLE 1

In one aspect, the invention relates to one-staged or two-staged confirmation process for speech driven systems. For example, HSC 100 may interpret and recognize voice or sound wave input as a command to "delete file." The action associated with this command is file deletion, and this pending action may be assessed as critical by the system. In response, as in the example depicted in FIG. 4, the user is presented with onscreen choices in dialog box 410, offering options such as "Delete File", or "Cancel". At this point the ASR takes over to listen for one of two commands, "Delete File" or "Cancel." In the alternative, this action can be standard operating procedure, instead of being solicited only in response to pending actions deemed "critical," as set forth above.

Even where such a one-stage confirmation is used, however, there is a risk that the ASR will accidentally process background noise or user speech not intended as a command to be the confirmation sought by the first stage dialog box or other confirmation mode, and an unintended action may be performed. In practice this may occur if there is a lot of background noise, or if the system misinterprets what the user said, as well as for the reasons that may cause the need for the inclusion of a confirmation screen in the first place. Therefore in order for the system to be fool-proof for any major action, a secondary dialog box 420 can be imposed to confirm that a pending action is intentional and desired by the user.

This secondary dialog box 420 can additionally include an automatic timeout or a selectable duration, such as, for example, 10 seconds. If no discernible answer has been received in this time period, the 'Cancel' button will be programmatically pressed, the dialog box dismissed and the user action cancelled. The appearance of a secondary confirmatory dialog box can also be dependent on the assessed criticality of the pending action.

This is in effect to stop accidental triggers due to noise. For example, the ASR might misinterpret noise as the command 'delete file' in the first instance. This is unlikely, but does happen. At this point, system 100 responsively deploys first dialog box 410 followed by the secondary dialog box 420 to piecewise in two stages ask for confirmation. It is now very unlikely that the ASR will be triggered by noise within the 10 second window. If the 10 seconds expires, the action of 'Cancel' will ensue, returning the user back to their operating screen.

If on the other hand the action was intentional as spoken by the user, it is easy to navigate the initial command (dialog box 410) followed by a secondary confirmation box (screen view) 420.

EXAMPLE 2

In another aspect the invention relates to a one-stage or two-stage Limited ASR Mode for speech-driven systems.

HSC 100 can be placed into a limited ASR mode in which it does not recognize or react to all spoken commands. This allows the ASR to be put into limited operation mode that stops it from reacting to our spoken word. This is especially useful if we have a screen-full of data that we don't want to change, but will be engaged in conversation while looking at the screen. In normal circumstances our active conversation may trigger the ASR, causing the onscreen information to change.

While this limited ASR mode can provide protection from inadvertent activation, there is risk that the system can be inadvertently disengaged from this state, such as when disengagement is triggered by a voice command. In that case, ambient noise or user speech not intended as a command to HSC 100 could be interpreted by ASR as the disengagement command, triggering inadvertent disengagement from limited mode.

We want to avoid accidental wake-ups due to noise or the ASR misinterpreting conversations so we can issue a command to put the device into limited ASR mode, and then rely on the device to ignore all spoken phrases until the correct double command sequence is issued. For example, if the user places a telephone call via the device, the device will likely want to switch to limited ASR mode, and offer the user a single verbal command to 'Disconnect Call'.

In order to make sure the user really wants to disconnect a call, rather than trigger accidentally during the user's conversation, a two-stage confirmation can be used, such as is described above.

For example, in a limited ASR mode all of the available current speech commands can be replaced with just one phrase such as 'Computer Wake Up'. This can be seen by reference to FIG. 5, which shows exemplary dialog boxes 510, 520 in accordance with aspects of the invention. The same one phase or two phase approach described above can be used in connection with restoring the device from a limited ASR mode.

Upon recognizing the trigger word, Dialog box 510 prompts the user to confirm that the user desires to disengage the system from a limited mode. Optionally, if the user speaks the prompted phrase, here 'Wake-up,' the wake-up button 512 can change to an activated appearance, such as for example highlighted or bold, to confirm that input has been received and recognized. As before, a second dialog box 520 appears to allow the user to confirm that awakening from limited mode is desired, by speaking a second word, such as "Confirm" (associated with button 522). In the alternative the user can utter "Cancel" (button 524), ending the disengagement process. A timeout feature can also be included.

EXAMPLE 3

In yet another aspect of the invention, the same two phase approach can be used to restore the device from a low power sleep mode. In this sleep mode we can turn off unused peripherals, reduce the main CPU speed, dim the screen or turn it off, and replace all of the available current speech commands with just one phrase such as 'Computer Wake Up'. However we do not put the device to full sleep mode; we leave just the ASR running, listening for the wake-up phrase.

As shown in FIG. 6, in this mode we are now listening for the one wake up command only, as prompted by dialog box 610, which can be permanently displayed in a portion of the screen during sleep mode operation, or which can appear in response to audio input from the microphone. If the word provided for in dialog box 610, here "Wake-up" (button 612) is spoken, a second stage dialog is used for confirmation before the device is really woken up (triggered out of sleep/low power mode) The second dialog box (screen view) 620 includes confirmation instructions and user-selectable options (e.g. "confirm" button 622 and "cancel" button 624). If the ASR triggers the first phase based on noise or random conversation, the second stage confirmation will likely not be triggered, especially if programmed to time out (automatically "cancel" via button 624) after 10 seconds, returning the device to its low power sleep mode.

It should be appreciated that additional methods and processes can be used to reduce the likelihood that audio input will be inadvertently recognized as command input, and processed as such. These methods facilitate operation of HSC 100 in a multitude of environments, including noisy environments and for extended periods of time. In some environments, where a group of users are using HSC 100 headsets, for example, the headsets may communicate with each other or with a central computer, such that information regarding audio inputs can be shared, and this shared information can be used to identify sounds that are background noises. For example, where similar sounds are received at a plurality of HSC microphones at the same time, the sound is likely to be background noise, rather than the voice of a user.

In addition, a form of background noise subtraction can be used to improve the speech audio signal quality. A single, or multiple, HSCs 100 can be equipped with a plurality of microphones to detected background noise. This noise can then be subtracted out of the signal detected from the microphone on the HSC positioned to receive voice commands. For example, two microphones can be installed on the same HSC 100, one positioned and/or aimed at the user's mouth, and another positioned/aimed generally away from the user's mouth, with the second microphone detecting substantial background noise. This background noise is likely also a component of the signal detected at the first microphone, so signal from the second microphone can be subtracted from the signal from first microphone to enhance the quality of the voice component of the audio signal.

Figure 7:
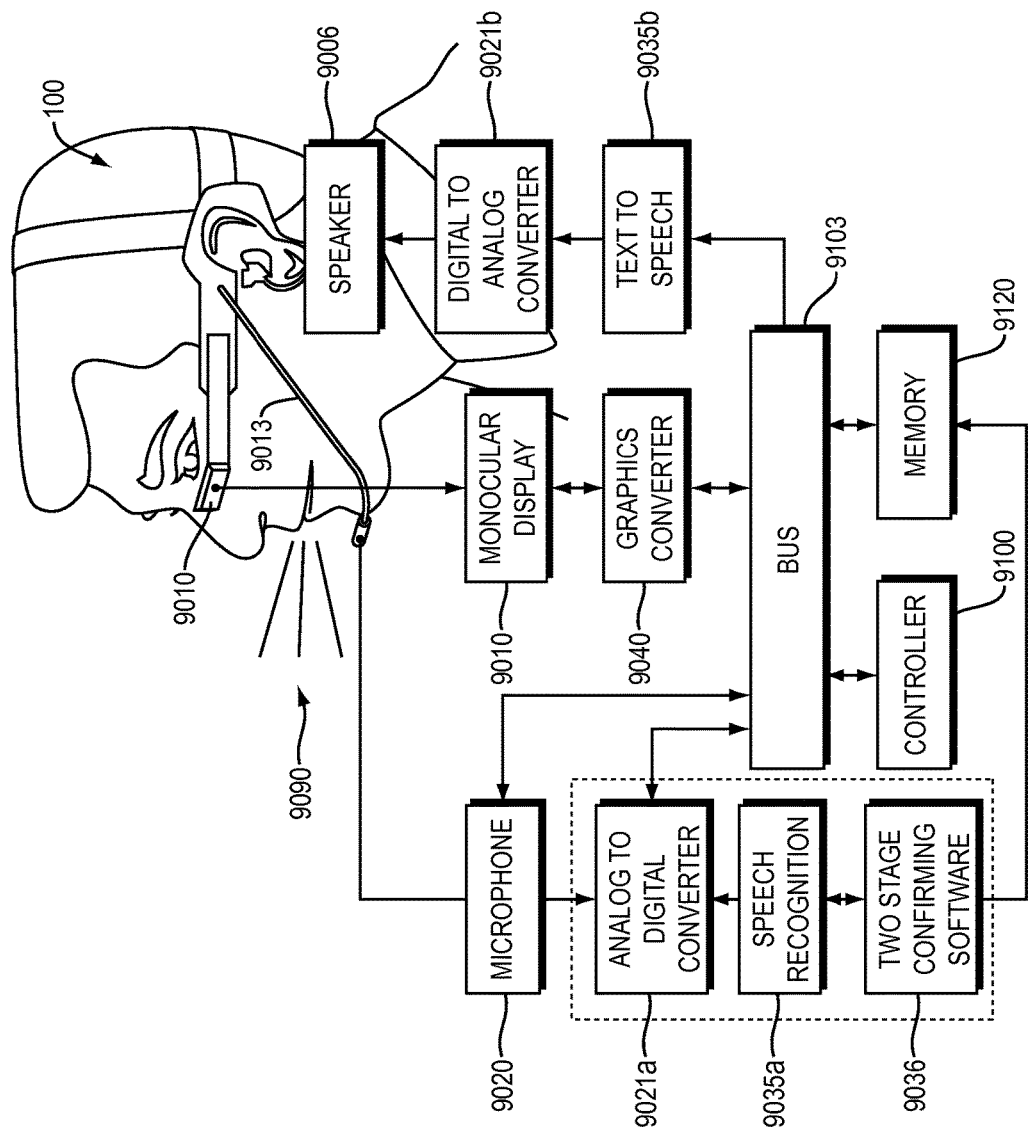
FIG. 7 is a block view of a headset computer implementing two-stage confirmation in ASR according to the present invention

FIG. 7 shows an exemplary non-limiting wireless hands-free video computing headset, HSC 100, configured for operation under voice command, and showing schematic modules. In this embodiment, the headset includes a microdisplay 9010, speaker 9006, and microphone 9020. Microphone 9020 is depicted as being at the end of arm 9013. In the alternative, microphone 9012 can be mounted to the arm connected to microdisplay 9010.

In operation of HSC 100, the user can be presented with an image on the microdisplay 9010, for example, as output by a host computer 200 application, as mentioned above. The user can also receive audio output via speaker 9006 and provide voice input 9090 via microphone 9012. With respect to voice input, when the user speaks into microphone 9012, the microphone converts the analog audio (sound) signal into a digital signal in module 9021a. The digitized audio signal is then processed by speech recognition engine 9035a in order to translate the digitized audio signal to words or other symbols. The translated signal can then be used as an input to a processor, such as a processor 84 running an application 92, that determines whether the voice input corresponds to a command, and if so, trigger appropriate action. In particular, the processor 84 determines action associated with the command, assesses criticality of the associated action, and for assessed criticality over a threshold, stay or condition performance of the action until successful completion of staged (one or more) confirmation. Critical threshold level may be stored, preset (predefined) parameter (constant) in memory 9120, for example.

For the case of two-stage confirmation in speech driven applications, controller 9100 accesses two-stage confirmation module 9036, which can be located locally to each HSC 100 or HMD or located remotely at a host 200. Two-stage confirmation software module 9036 contains instructions to display to a user an image of a pertinent message box or the like, such as those provided below in examples and detailed in FIGS. 4-6. The graphics converter module 9040 converts the image instructions received from the two-stage confirmation module 9036 via bus 9103 and converts the instructions into graphics to display on the monocular display 9010.

At the same time text-to-speech module 9035b converts instructions received from two-stage confirmation software module 9036 to create sounds representing the contents for the image to be displayed. The instructions are converted into digital sounds representing the corresponding image contents that the text-to-speech module 9035b feeds to the digital-to-analog converter 9021b, which in turn feeds speaker 9006 to present the audio to the user.

Two-stage confirmation software module 9036 can be stored locally at memory 9120 or remotely at a host 200. The user can speak/utter the command selection from the image and the user's speech 9090 is received at microphone 9020. The received speech is then converted from an analog signal into a digital signal at analog-to-digital converter 9021a. Once the speech is converted from an analog to a digital signal speech recognition module 9035a processes the speech into recognize speech. The recognized speech is compared against known speech and the two-stage confirmation module according to the instructions 9036.

A user of HSC 100 or a HMD can use two stage confirmation software module 9036, either locally or from a remote host 200, in which the user is presented with an image of a message box, text box or dialogue box (for example 420, 520, 620 of FIGS. 4-6) requesting user confirmation on the microdisplay 9010 and the audio of the same rendered through the speaker 9006 of the headset computer 100. Because the headset computer 100 is also equipped with a microphone 9020, the user can utter the confirming word or phrase (command selection). Or the headset computer can automatically time-out on the confirmatory operation as described above in examples of FIGS. 4-6. Time-out settings mat be stored in memory 9120 for example.

While this invention has been particularly shown and described with references to example embodiments thereof, it will be understood by those skilled in the art that various changes in form and details may be made therein without departing from the scope of the invention encompassed by the appended claims.

What is claimed is:

1. A method of speech control in a computer application, comprising:
   given a headset computer having a microphone and a display, receiving a sound input via the microphone;
   processing the sound input using a speech recognition engine coupled to the headset computer;
   interpreting the sound input to be a command;
   assessing a level of criticality of an action associated with the command;
   determining that the assessed level of criticality meets or exceeds a threshold level of criticality; and
   in response to the determination that the assessed level of criticality meets or exceeds the threshold level of criticality:
   (i) displaying a first dialog box on the display,
   (ii) receiving via the microphone a first confirmatory utterance corresponding to a prompt in the first dialog box,
   (iii) displaying a second dialog box on the display in response to the receipt of the first confirmatory utterance, and
   (iv) conditioning headset computer performance of the action on a user making a second confirmatory utterance corresponding to a prompt in the second dialog box, wherein the displaying of the second dialog box is configured to automatically time out and the command is cancelled if a second confirmatory utterance is not received within a defined time period.

2. The method of claim 1, wherein the displaying of the first dialog box is able to automatically time-out.

3. The method of claim 1, wherein the command is a command for the headset computer to disengage from a low power sleep mode.

4. The method of claim 1, wherein the command is a command for the headset computer to disengage from a limited speech recognition mode.

5. The method of claim 1, wherein the first confirmatory utterance and the second confirmatory utterance are different from each other.

6. A speech control apparatus comprising:
given a headset computer having a display and a microphone configured to receive a sound input;
a speech recognition engine configured to interpret the sound input and as part of that interpretation determine whether the sound input is a command, assess a level of criticality of an action associated with the command, and determine that the assessed level of criticality meets or exceeds a threshold level of criticality; and
a processor communicatively coupled to the speech recognition engine, and in response to the determination by the speech recognition engine that the assessed level of criticality meets or exceeds the threshold level of criticality, configured to:
(i) display a first dialog box on the display,
(ii) receive via the microphone a first confirmatory utterance corresponding to a prompt in the first dialog box;
(iii) display a second dialog box on the display in response to the receipt of the first confirmatory utterance, and
(iv) condition headset computer performance of the action on a user making a second confirmatory utterance corresponding to a prompt in the second dialog box, wherein the displaying of the second dialog box is configured to automatically time out and the command is cancelled if a second confirmatory utterance is not received within a defined time period.

7. The apparatus of claim 6, wherein the first dialog box is able to automatically time-out.

8. The apparatus of claim 6, wherein the command is a command for the headset computer to disengage from a low power sleep mode.

9. The apparatus of claim 6, wherein the command is a command for the headset computer to disengage from a limited speech recognition mode.

10. The apparatus of claim 6, wherein the first confirmatory utterance and the second confirmatory utterance are different from each other.

11. A headset computer comprising:
a display;
a microphone receiving sound input;
a speech recognition engine configured to interpret the sound input and as part of that interpretation determine whether the sound input is a command, assess a level of criticality of an action associated with the command, and determine that the assessed level of criticality meets or exceeds a threshold level of criticality; and
a processor communicatively coupled to the speech recognition engine, and in response to the determination by the speech recognition engine that the assessed level of criticality meets or exceeds the threshold level of criticality, configured to:
(i) display a first dialog box on the display,
(ii) receive via the microphone a first confirmatory utterance corresponding to a prompt in the first dialog box;
(iii) display a second dialog box on the display in response to the receipt of the first confirmatory utterance, and
(iv) condition headset computer performance of the action on a user making a second confirmatory utterance corresponding to a prompt in the second dialog box, wherein the displaying of the second dialog box is configured to automatically time out and the command is cancelled if a second confirmatory utterance is not received within a defined time period.

* * * * *